(12) United States Patent
Hong et al.

(10) Patent No.: US 10,027,629 B2
(45) Date of Patent: Jul. 17, 2018

(54) SHORT MESSAGE SERVICE READING METHOD AND DEVICE

(71) Applicant: Xiaomi Inc., Beijing (CN)

(72) Inventors: Feng Hong, Beijing (CN); Jiankai Zhao, Beijing (CN); Wankun Yang, Beijing (CN); Jianchun Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/215,066

(22) Filed: Jul. 20, 2016

(65) Prior Publication Data

US 2017/0085533 A1   Mar. 23, 2017

(30) Foreign Application Priority Data

Sep. 18, 2015   (CN) .......................... 2015 1 0599836

(51) Int. Cl.
| | |
|---|---|
| *H04W 4/14* | (2009.01) |
| *H04L 29/06* | (2006.01) |
| *H04W 4/12* | (2009.01) |
| *H04W 12/08* | (2009.01) |
| *G06Q 20/32* | (2012.01) |
| *H04W 12/02* | (2009.01) |

(52) U.S. Cl.
CPC .......... *H04L 63/04* (2013.01); *G06Q 20/322* (2013.01); *H04L 63/108* (2013.01); *H04W 4/12* (2013.01); *H04W 4/14* (2013.01); *H04W 12/02* (2013.01); *H04W 12/08* (2013.01)

(58) Field of Classification Search
CPC ....... H04L 63/04; G06Q 20/322; H04W 4/14; H04W 12/02

USPC ................................ 455/466; 726/26, 27, 28
See application file for complete search history.

(56) References Cited

U.S. PATENT DOCUMENTS

| | | | |
|---|---|---|---|
| 8,543,821 B1 | 9/2013 | Gabrielson | |
| 8,561,206 B1 | 10/2013 | Paul et al. | |
| 9,043,918 B2 | 5/2015 | Bhattacharjee | |
| 2007/0043815 A1 | 2/2007 | Tsang et al. | |

(Continued)

FOREIGN PATENT DOCUMENTS

| | | |
|---|---|---|
| CN | 101072093 A | 11/2007 |
| CN | 101252748 A | 8/2008 |

(Continued)

OTHER PUBLICATIONS

Partial Supplementary European Search Report corresponding to European Application No. 16176449.3, dated Nov. 7, 2016, pp. 1-6.

(Continued)

*Primary Examiner* — Kamran Afshar
*Assistant Examiner* — Farid Seyedvosoghi
(74) *Attorney, Agent, or Firm* — Brinks, Gilson & Lione

(57) ABSTRACT

A Short Message Service (SMS) reading method and device are disclosed for providing security when authorizing SMS reading. After a reading request for reading an SMS is received from a third party application, when the SMS is an SMS including sensitive information, a determination as to whether a reading time in the reading request is within an access prohibition period of the SMS may be implemented, and when the reading time is determined to be within the access prohibition period, a response to the reading request may be withheld.

15 Claims, 15 Drawing Sheets

(56) References Cited

U.S. PATENT DOCUMENTS

| | | |
|---|---|---|
| 2009/0054038 A1 | 2/2009 | Ranjan et al. |
| 2009/0144829 A1 | 6/2009 | Grigsby et al. |
| 2010/0115289 A1 | 5/2010 | Han |
| 2011/0154040 A1 | 6/2011 | Bheemanna |
| 2012/0157049 A1 | 6/2012 | Eliovits et al. |
| 2012/0192287 A1* | 7/2012 | Cai .................. G06F 21/606 726/28 |
| 2012/0291103 A1 | 11/2012 | Cohen |
| 2013/0014212 A1 | 1/2013 | Cohen |
| 2013/0097203 A1 | 4/2013 | Bhattacharjee |
| 2013/0097652 A1 | 4/2013 | Bhattacharjee et al. |
| 2014/0041038 A1 | 2/2014 | Lessin et al. |
| 2014/0128047 A1 | 5/2014 | Edwards et al. |
| 2014/0325601 A1 | 10/2014 | Sun |
| 2014/0349625 A1 | 11/2014 | Edwards et al. |
| 2015/0220734 A1 | 8/2015 | Nalluri et al. |
| 2015/0237011 A1 | 8/2015 | Bhattacharjee et al. |
| 2017/0208470 A1* | 7/2017 | Hu ..................... H04W 12/08 |

FOREIGN PATENT DOCUMENTS

| | | |
|---|---|---|
| CN | 102103537 A | 6/2011 |
| CN | 102480726 A | 5/2012 |
| CN | 102810143 A | 12/2012 |
| CN | 102917346 A | 2/2013 |
| CN | 103079113 A | 5/2013 |
| CN | 103106578 A | 5/2013 |
| CN | 103116716 A | 5/2013 |
| CN | 103310135 A | 9/2013 |
| CN | 103310169 A | 9/2013 |
| CN | 103327492 A | 9/2013 |
| CN | 103514397 A | 1/2014 |
| CN | 103686716 A | 3/2014 |
| CN | 103761471 A | 4/2014 |
| CN | 103761472 A | 4/2014 |
| CN | 103916471 A | 7/2014 |
| CN | 104009977 A | 8/2014 |
| CN | 104125547 A | 10/2014 |
| CN | 104202735 A | 12/2014 |
| CN | 104640116 A | 5/2015 |
| CN | 104657674 A | 5/2015 |
| CN | 104768139 A | 7/2015 |
| EP | 2 028 829 A1 | 2/2009 |
| JP | 2004-102394 A | 4/2004 |
| JP | 2007-164613 A | 6/2007 |
| JP | 2008-125614 A | 6/2008 |
| JP | 2010-278852 A | 12/2010 |
| JP | 2012-046406 A | 3/2012 |
| JP | 2012-132296 A | 7/2012 |
| JP | 2013-045384 A | 3/2013 |
| JP | 2014-039193 A | 2/2014 |
| KR | 10-2014-0033567 A | 3/2014 |
| KR | 10-2015-0005343 A | 1/2015 |
| KR | 10-2015-0065083 A | 6/2015 |
| KR | 10-2015-0075349 A | 7/2015 |
| RU | 2 408 069 C2 | 12/2010 |
| RU | 2 524 868 C2 | 8/2014 |
| WO | WO 2006-001524 A1 | 1/2006 |
| WO | WO 2010/026540 A1 | 3/2010 |
| WO | WO 2010/145811 A1 | 12/2010 |
| WO | WO 2013055501 A1 | 4/2013 |

OTHER PUBLICATIONS

Extended European Search Report dated Feb. 8, 2017 for European Application No. 16176449.3, 10 pages.
International Search Report dated Jun. 22, 2016 for International Application No. PCT/CN2015/100007, 9 pages.
Extended European Search Report dated Dec. 6, 2016 for European Application No. 16184845.2, 9 pages.
Extended European Search Report dated Nov. 7, 2016 for European Application No. 16175767.9, 7 pages.
International Search Report and Written Opinion dated Jun. 7, 2016 for International Application No. PCT/CN2015/099986, 5 pages.
International Search Report and Written Opinion dated Jun. 22, 2016 for International Application No. PCT/CN2015/100007, 5 pages.
International Search Report and Written Opinion dated May 18, 2016 for International Application No. PCT/CN2015/099988, 6 pages.
Mulliner, Collin et al., "SMS-Based One-Time Passwords: Attacks and Defense," Network and Parallel Computing, K. Rieck et al. (Eds.), Springer-Verlag, DIMVA 2013, LNCS 7967, 2013, pp. 150-159.
Office Action dated Aug. 28, 2017 for Chinese Application No. 201510600885.3, 20 pages.
Office Action dated Sep. 4, 2017 for Chinese Application No. 201510599836.2, 22 pages.
Office Action dated May 26, 2017 for Korean Application No. 10-2016-7026752, 9 pages.
Office Action dated Jul. 17, 2017 for Korean Application No. 10-2016-7028071, 9 pages.
Office Action dated Jan. 29, 2018 for Japanese Application No. 2016-556782, 5 pages.
Office Action dated Nov. 21, 2017 for Russian Application No. 2016135920/08, 13 pages.
Office Action dated Nov. 23, 2017 for Russian Application No. 2016135980/07, 10 pages.
Office Action dated Dec. 5, 2017 for Russian Application No. 2016132970/08, 13 pages.
Office Action dated Feb. 27, 2018 for Chinese Application No. 201510599211.6, 8 pages.
Office Action dated Oct. 31, 2017 for Japanese Application No. 2016-556275, 3 pages.
Office Action dated Nov. 21, 2017 for Japanese Application No. 2016-556266, 11 pages.
Office Action dated Apr. 16, 2018 for Chinese Application No. 201510599836.2, 10 pages.
Office Action dated Apr. 25, 2018 for Chinese Application No. 201510600885.3, 10 pages.

* cited by examiner

1000

SHORT MESSAGE SERVICE READING METHOD AND DEVICE

CROSS-REFERENCE TO RELATED APPLICATIONS

The present application claims priority to Chinese patent application No. 201510599836.2, filed on Sep. 18, 2015, the entirety of which is hereby incorporated by reference herein.

TECHNICAL FIELD

The present disclosure relates to the field of information security, particularly to a method and device for reading an Short Message Service (SMS).

BACKGROUND

In an operating system running on a computing device, a third party application may be authorized to read an SMS. In situations where the third party application is actually a malicious application, the third party application may read a verification code in the SMS and acquire an authority of executing a sensitive operation, such as an authority of executing a payment operation, and an authority of executing registration and login and so on, which may not be authorized or intended by a user.

SUMMARY

A method for reading a SMS may be provided according to an embodiment of the present disclosure. The method may include a reading request of reading an SMS is received from a third party application, when the SMS is an SMS carrying sensitive information, whether a reading time of the reading request is in an access prohibition period of the SMS is detected, and when the reading time is in the access prohibition period, the reading request is not responded.

A device for reading a SMS may be provided according to another embodiment of the present disclosure. The device may include a request receiving module, configured to receive from a third party application a reading request of reading an SMS, a time detecting module configured to detect, when the SMS is an SMS carrying sensitive information, whether a reading time of the reading request is in an access prohibition period of the SMS, and a request responding module configured to make, when the reading time is in the access prohibition period, no response to the reading request.

A device for reading a SMS may be provided according to another embodiment of the present disclosure. The device may incldue a processor, and a memory, configured to store executable instructions. The executable instructions may be executed by the processor to: receive from a third party application a reading request of reading an SMS, when the SMS is an SMS carrying sensitive information, detect whether a reading time of the reading request is in an access prohibition period of the SMS, and when the reading time is in the access prohibition period, not respond to the reading request.

DETAILED DESCRIPTION

Figure 1:
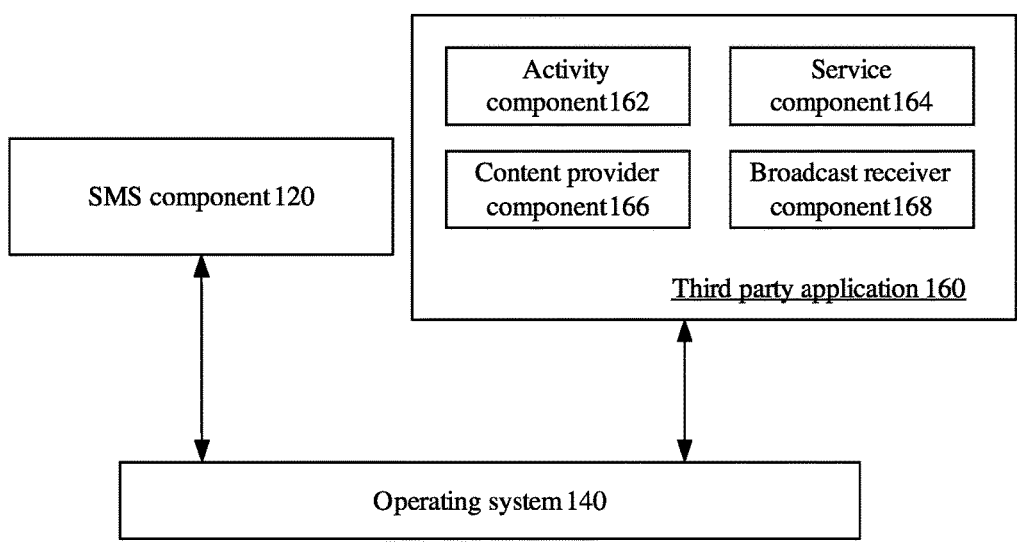
FIG. 1 is a schematic diagram of components of a mobile device according to an exemplary embodiment.

The embodiments of the present disclosure will be further expounded hereinafter with reference to the accompanying drawings so that the purposes, technical solutions and advantages of the embodiments of the present disclosure are clearer. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

The following provides exemplary descriptions for several terms involved in the embodiments of the present disclosure.

Android operating system: a Linux-based operating system of free and open source codes, which is produced by Google and mainly applied to a mobile device. The mobile device may be a mobile phone, a tablet computer, an electronic book reader, a Moving Picture Experts Group Audio Layer III (MP3) player, a Moving Picture Experts Group Audio Layer IV (MP4) player, a portable laptop computer and so on.

Application: an application generally includes at least one program component in an operating system running on a mobile device (e.g., Android operating system). There may be four program components included as part of the application, which are an activity component, a service component, a content provider component and a broadcast receiver component.

Activity component: which is a component responsible for interacting with a user in an application (e.g., Android application) by at least providing a visible user interface for the application, where information may be requested of a user and information may be received from the user via the user interface. One application may include one or more activity components.

Service component: which is a component operating in the background of an operating system and/or application and may not be responsible for providing a user interface in an application (e.g., Android application) because the service component may not be configured to interact directly with a user of the application. An application (e.g., Android application) may include one or more service components configured to implement specific tasks for the application. For example, when the application is a clock application, a service component for the clock application may be configured to obtain a system time from the operating system (e.g., Android) on which the application is running.

Content provider component: which is a component configured to provide data, such as an SMS, a tone, a piece of wallpaper, contacts and so on, for other applications or for other components in a current application in an application (e.g., Android application). The content provider component may encapsulate data in various formats and provide the data to other applications or components in a standard form, wherein an SMS component in the embodiments of the present disclosure is an exemplary content provider component.

Broadcast receiver component: which is configured to receive and respond to a message that is broadcast by an operating system. The broadcast receiver component can receive a message of interest (or a message of a predefined message type) and then process and forward the message to other components in a current application. The message of interest may be a short messaging service (SMS) message. For example, when a status of sensors on included on the mobile device running the application changes, the operating system may broadcast the status change such that the application may receive the status change information. A navigation based application may need to know the status of a global positioning sensor (GPS), and therefore the navigation based application may set up a broadcast receiver component to identify and receive messages related to GPS that are broadcast by the operating system.

Third party application: which is an application that is distinguishable from preinstalled applications of an operating system in a mobile device.

FIG. 1 shows a schematic diagram of components of a mobile device 100 according to an exemplary embodiment. The mobile device 100 includes an SMS component 120, an operating system 140 and a third party application 160. The operating system 140 may be configured to receive a reading request from the third party application 160, and forward the reading request to the SMS component 120 in response to receiving the reading request.

The mobile device 100 may be a mobile phone (e.g., a smartphone), a tablet computer, an electronic book reader, an MP3 player, an MP4 player, a portable laptop computer and so on.

The SMS component 120 may be a content provider component in an application (e.g., Android application) running on the mobile device 100, where the SMS component 120 may be configurd to provide SMS data for other applications or other components of the application. The SMS component 120 may receive SMSs from a source party, and store received SMSs in a memory of the mobile device 100 to form an SMS list. A source party may include a server corresponding to the application, a server for a financial institution involved in a financial transaction related to the user, a server corresponding to a government entity responsible for regulating communication networks, or the like.

The operating system 140 may pre-store a configuration file, where the configuration file stores an SMS reading authority of the third party application 160 at the operating system level. The SMS reading authority may include one or more authority rules that identify a reading authority assigned to the third party application 160, as well as other applications, running on the mobile device 160. The reading authority may identify certain SMS content that may, or may not, be read from the SMS component 120.

Alternatively, or in addition, the operating system 140 may store a general configuration file. The general configuration file may store SMS reading authorities of all third party applications running on the mobile device 100, including the third party application 160, at the operating system level.

Alternatively, or in addition, the operating system 140 may store a plurality of configuration files, and the plurality of configuration files may store SMS reading authority of each third party application running on the mobile device 100, including the third party application 160, at the operating system level respectively.

The third party application 160, when the SMS reading authority is included at the operating system level, may be authorized to read all SMSs in the SMS component 130, and the third party application 160 without the SMS reading authority at the operating system level cannot read any SMS in the SMS component 120.

The third party application 160 may include one or more program components, including: an activity component 162, a service component 164, a content provider component 166, or a broadcast receiver component 168.

When the third party application 160 is configured, and/or authorized, to read an SMS in the short message component 120, the third party application 160 may transmit a reading request for reading the SMS to the operating system 140 first. After receiving the reading request, the operating system 140 may determine whether the third party application 160 is in an SMS reading authority list, and when the third party application 160 is determined to be in the SMS reading authority list (thus authorizing the third party application 160 to read the SMS in the short message component 120), the operating system 140 may forward to the SMS component 120 the SMS reading request sent by the third party application 160. After receiving the reading request forwarded by the operating system 140, the SMS component 120 may search for the SMS to be read as identified in the reading request. The SMS component 120 may, for example, search for the SMS from a list of SMS messages stored in a memory accessible by the SMS component 120. After locating and accessing the SMS to be read, the SMS component 120 may then feed back the SMS to be read to the third party application 160 through the operating system 140.

Figure 2:
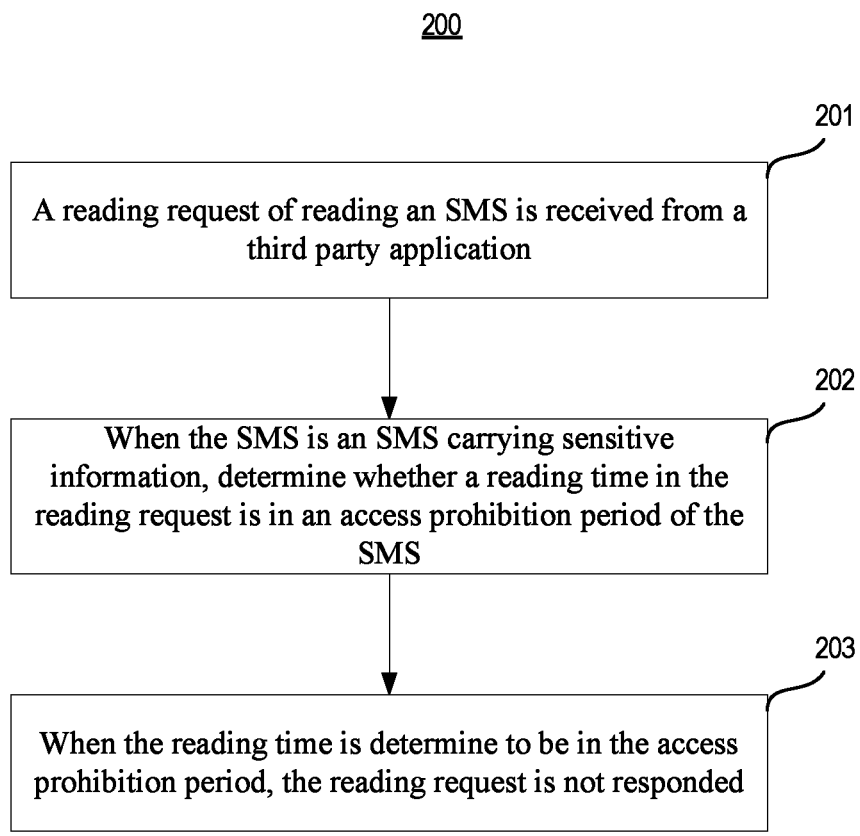
FIG. 2 is a flowchart of an SMS reading method according to an exemplary embodiment.

FIG. 2 shows a flowchart 200 of logic for a mobile device implementing an SMS reading method according to an exemplary embodiment. The present embodiment illustrates the SMS reading method applied in the mobile device 100 as shown in FIG. 1 as an example. The SMS reading method may include several processes, including those provided as follows.

At 201: A reading request for reading an SMS is received from a third party application by an operating system running on the mobile device 100.

The third party application may be an application in a configuration file of an operating system running on the mobile device 100, and the configuration file may be a file for performing authority control according to an application granularity. Specifically, the authority for the third party application to access other resources (such as another application) is set in the configuration file at the application level. Thus the authority of the third party application access application such as an SMS application via the operating system configuration file is all or nothing: the operating system either may either allow the third party application to access the all functionality or all messages of the SMS application or completely deny access. The configuration file from the operating system is not suitable to control access below the application level, e.g., one SMS application function or an individual message by the third party application. The embodiment shown in FIG. 2, however, allows for access control at sub-application level, e.g., within the SMS application.

At 202: When the SMS is an SMS carrying sensitive information, a determination may be implemented on whether a reading time of the reading request is within an access prohibition period corresponding to the SMS. The sensitive information described in this disclosure may be, for example, representative of a password, account number for a financial institution, or an account number for a credit card, or other information that may be considered sensitive information for a user. The sensitive information may further include, for example, CAPTCHA or verification code information that has been pushed to the third party application by an application server of the third party application, the user's private information, keywords that are preset by the user, or temporary passwords that are pushed to the third party application by financial institutions. The reading time may be information included in the reading request that identifies a time during which the SMS identified in the reading request is requested for reading by the third party application. The reading time may also be the time when the request for reading is sent by the third party application, or the reading time may be the time when the operating system receives the request for reading from the third party application.

The access prohibition period may be a period during which the operating system may implement controls to prevent the third party application from having access to one or more other applications and/or components of the mobile device 100.

At 203: When the reading time is determined to be within the access prohibition period, the operating system may not transmit a response to the reading request back to the third party application.

It follows that according to the SMS reading method provided by flow chart 200, a reading request of reading an SMS may be received from a third party application, when the SMS is an SMS carrying sensitive information, a determination may be made as to whether a reading time of the reading request is in an access prohibition period corresponding to the SMS, and when the reading time is determined to be within the access prohibition period, the reading request may not be responded to. This provides a solution to the problem of a malicious application being able to read sensitive information included in the SMS without proper authorization by preventing third party applications from reading SMS messages during an access prohibition period. For example, the SMS reading method provided by flowchart 200 may prevent a malicious application from reading a verification code in an SMS to acquire an authority of executing a sensitive operation. The SMS reading method provided by flowchart 200 may prevent a third party application having an SMS reading authority at the operating system level from reading all SMSs in an SMS component where some of the SMS messages may include sensitive information. Instead, the SMS reading method provided by flowchart 200 controls a third party application to prevent the third party application from reading the SMS content of the SMS during an access prohibition period, thus avoiding leakage of the sensitive information in the SMS during the access prohibition period while implementing authority control for a single SMS granularity.

Figure 3A:
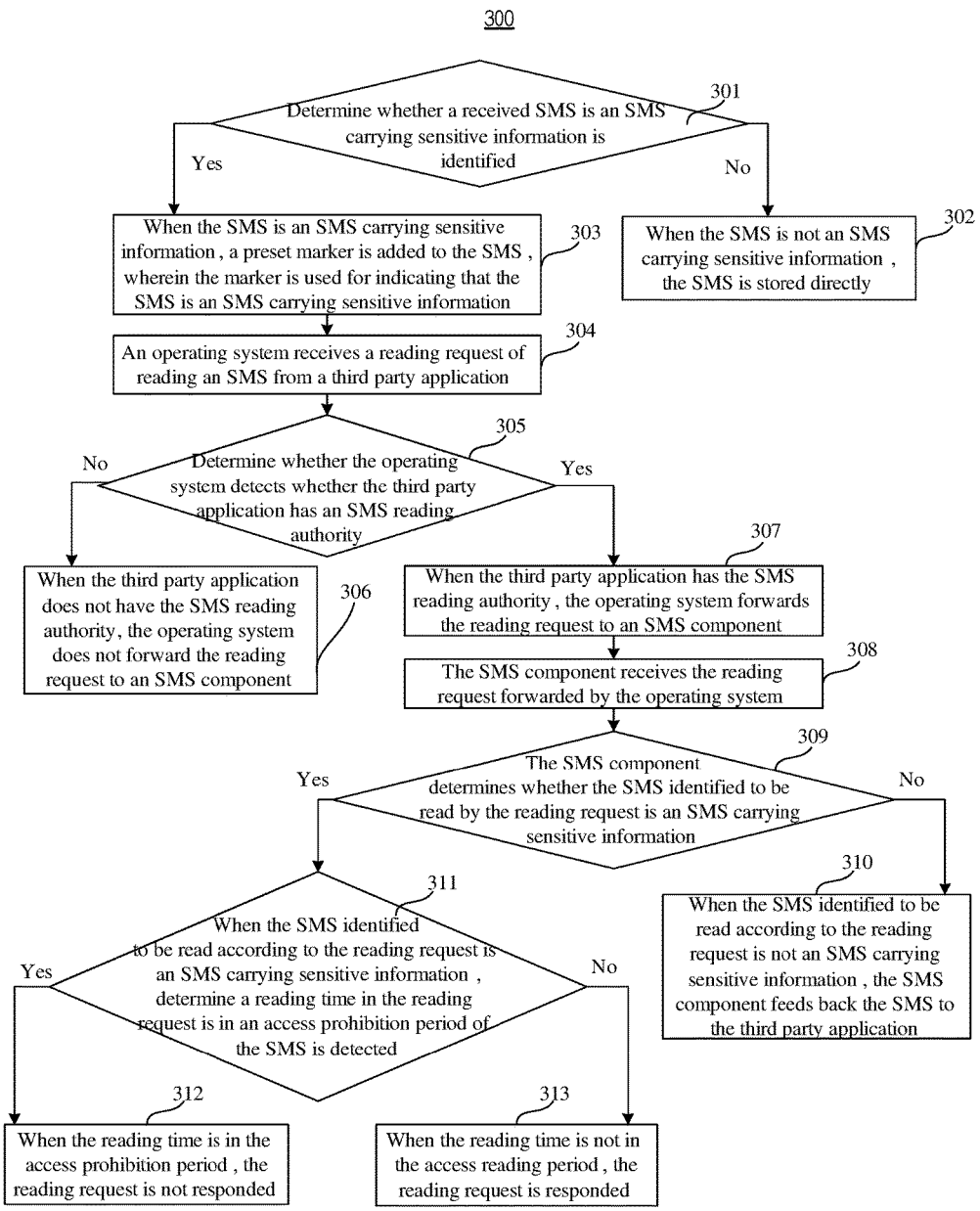
FIG. 3A is a flowchart of an SMS reading method according to another exemplary embodiment.

FIG. 3A shows a flowchart 300 of logic for a mobile device implementing an SMS reading method according to another exemplary embodiment. The present embodiment illustrates the SMS reading method applied in the mobile device 100 as shown in FIG. 1 as an example. The SMS reading method may include several processes, including those provided as follows.

At 301: A determination as to whether a received SMS is an SMS carrying sensitive information may be implemented.

The sensitive information may be information related to properties and/or a control authority of a user in a network. Exemplary properties include banks and properties in networks.

The SMS component may receive an SMS from an SMS source party and determine whether the received SMS includes sensitive information. SMS messages that are determined to include sensitive information may be identified as such.

Determining whether the received SMS includes sensitive information may include the SMS component determining whether the SMS is an SMS carrying sensitive information based on characteristic information of the SMS, wherein the characteristic information may include at least one of a sender number, an SMS content, or an SMS template.

At 302: When the SMS is determined not to include sensitive information, the SMS may be stored directly. For example, the SMS may be stored directly into a memory of the mobile device 100.

At 303: When the SMS is determined to include sensitive information, a preset marker may be added to the SMS, wherein the preset marker indicates that the SMS is an SMS carrying sensitive information.

When the SMS component determines that the SMS includes sensitive information, the SMS component may add the preset marker to the SMS to indicate that the SMS is an SMS carrying sensitive information.

At 304: The operating system may receive a reading request for reading an SMS from a third party application.

When the third party application is operated to read an SMS stored in the SMS component (or otherwise accessible by the SMS component), the third party application may transmit the reading request for reading the SMS to the operating system first. Accordingly, the operating system receives the reading request for reading the SMS from the third party application.

Here, the third party application may be an SMS-class application, a payment-class application, a registration-class application, or other like application.

At 305: The operating system may determine whether the third party application that transmitted the reading request has an SMS reading authority.

The operating system may pre-store SMS reading authorities of third party applications. For example, the pre-stored SMS reading authorities may be a pre-stored authority list that identifies one or more third party applications and their corresponding authority rights for reading SMS messages. Then, when receiving the reading request for reading the SMS from the third party application, the operating system may parse the pre-stored authority list first, and determine whether the third party application is in the pre-stored authority list. When the third party application is found in the pre-stored authority list, the third party application may be determined to have an SMS reading authority for reading the SMS identified in the reading request. Otherwise, the third party application may be determined not to have the SMS reading authority for reading the SMS identified in the reading request.

At 306: When the third party application does not have the SMS reading authority, the operating system may not forward the reading request to the SMS component.

At 307: When the third party application has the SMS reading authority, the operating system may forward the reading request to the SMS component.

When it is detected by the operating system that the third party application has the SMS reading authority at the operating system level, the operating system forwards the reading request of the third party application to the SMS component.

At 308: The SMS component may receive the reading request forwarded by the operating system.

For example, a third party application "Xiaomi Mall" may transmit to the operating system, an SMS reading request that requests reading of a payment password by including an SMS message that reads, "Xiaomi payment,", then after receiving the reading request, the operating system may determine whether "Xiaomi Mall" has an SMS reading authority in the operating system, and when "Xiaomi Mall" is determined to have the SMS reading authority, the operating system may forward the reading request sent by "Xiaomi Mall" to the SMS component, and the SMS component may receive the reading request forwarded by the operating system.

At 309: The SMS component may determine whether the SMS to be read according to the reading request is an SMS carrying sensitive information.

For example, the SMS component may acquire, based on the received reading request, the SMS to be read according to the reading request and determine whether the SMS to be read according to the reading request includes a preset marker. When the preset marker is determined to be included in the SMS to be read, the SMS to be read may be determined to include an SMS carrying sensitive information. Without detection of the preset marker in the SMS to be read, the SMS to be read may be determined not to include sensitive information.

At 310: When the SMS to be read according to the reading request is not an SMS carrying sensitive information, the SMS component may feed back the SMS to be read to the third party application.

At 311: When the SMS to be read according to the reading request is an SMS carrying sensitive information, a determination may be made as to whether a reading time of the reading request is in an access prohibition period corresponding to the SMS to be read.

For example, the SMS component may acquire, based on the reading request forwarded by the operating system, the SMS to be read, and determine, based on the characteristic information of the SMS to be read, whether the SMS to be read is an SMS carrying sensitive information. When the SMS in the reading request is an SMS with a preset marker included, the SMS component may determine whether a reading time of the reading request is within an access prohibition period corresponding to the SMS to be read.

Figure 3B:
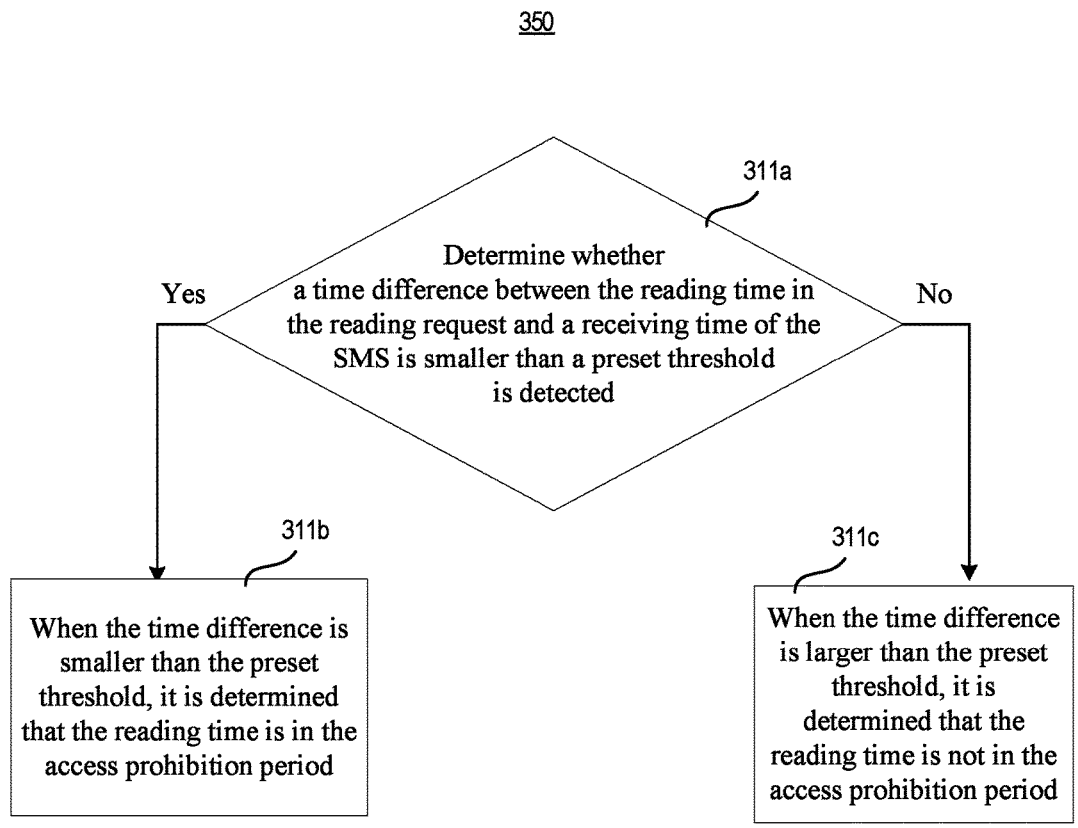
FIG. 3B is a flowchart of sub-steps of an SMS reading method according to still another exemplary embodiment.

In the present embodiment, Step 311 may include the following sub-processes, as shown in flowchart 350 of FIG. 3B.

At 311*a*: A determination as to whether a time difference between the reading time of the reading request and a receiving time of the SMS is smaller than a preset threshold may be implemented.

When the SMS in the reading request is an SMS with a preset marker, the SMS component may acquire a reading time in the reading request, calculate a difference between the reading time in the reading request and a receiving time of the SMS to be read to calculate a time difference between the two, and perform a detection to compare the acquired time difference with a preset threshold.

Alternatively, the preset threshold may be set according to the following methods.

First, the preset threshold may be set according to a default active duration.

For example, an active duration of a verification code may be 60 seconds, and an active duration of an activation code may be 1 hour.

Second, an active duration of the SMS may be extracted from an SMS content of the SMS, and the preset threshold is set according to the active duration. The SMS content may include alphanumerical information and/or image data that comprises the message of the SMS.

When the SMS component receives the SMS, an SMS content of the SMS may include an active duration of the SMS, then the SMS component may set the preset threshold according to the active duration in the SMS content of the SMS. The active duration of the SMS may identify a time period during which the corresponding SMS can be read by an application or component.

At 311*b*: When the time difference is smaller than the preset threshold, it may be determined that the reading time is in the access prohibition period.

When the time difference between the reading time in the reading request and the receiving time of the SMS to be read is smaller than the preset threshold, then the SMS component may determine that the reading time is in the access prohibition period.

For example, provided that the SMS component receives, at 10:58, an SMS carrying sensitive information, and a reading time in a received reading request forwarded by the operating system is 11:00, then a time difference between the reading time and the receiving time of the SMS is 1:00–10:58=2 minutes=120 seconds.

For example, the preset threshold may be set according to a default active duration which is 60 seconds, and it may be determined that the reading time is not in the access prohibition period since a duration of 120 seconds is longer than the preset threshold that is 60 seconds.

For example, the active duration of the SMS, which is extracted from the SMS content of the SMS, may be 5 minutes. Since a duration of 2 minutes is shorter than the preset threshold that is 5 minutes, it may be determined that the reading time is in the access prohibition period.

Alternatively, whether the reading time is in the access prohibition period may be further determined according to the following method.

When identifying that the SMS is an SMS carrying sensitive information, the SMS component may put the access prohibition period of the SMS into a countdown state according to a preset threshold. When receiving the reading request, the SMS component may acquire the reading time in the reading request, and when the reading time is in a countdown period, determine that the reading time is in the access prohibition period.

At 311*c*: When the time difference is larger than the preset threshold, it may be determined that the reading time is not in the access prohibition period.

When the time difference between the reading time in the reading request and the receiving time of the SMS to be read is larger than the preset threshold, the SMS component determines that the reading time in the reading request is not in the access prohibition period.

Referring back to flowchart 300, at 312: When the reading time is determined to be in the access prohibition period, the reading request is not responded back to the third part application.

For example, when the reading time in the reading request of the third party application is in the access prohibition period, the SMS component does not respond to the reading request.

At 313: When the reading time is determined not to be in the access reading period, the reading request is responded back to the third part application.

For example, when the reading time in the reading request of the third party application is not in the access prohibition period, the SMS component responds to the reading request.

Processes 301-303 and processes 304-308 in the flowchart 300 are not limited to specific sequences in the present embodiment. In other words, the process that the SMS component identifies whether the SMS is an SMS carrying sensitive information may be performed after the process that the reading request forwarded by the operating system is received, and whether the SMS is an SMS carrying sensitive information may be pre-identified before the reading request forwarded by the operating system is received.

In the SMS reading method provided in flowchart 300, a reading request of reading an SMS is received from a third party application, when the SMS is an SMS carrying sensitive information, whether a reading time in the reading request is in an access prohibition period of the SMS is detected, and when the reading time is in the access prohibition period, the reading request is not responded, so that the problem that a malicious application can read a verification code in an SMS to acquire an authority of executing a sensitive operation due to the reason that a third party application only having an SMS reading authority at the operating system level can read all SMSs in an SMS component is solved, and for an SMS carrying sensitive information, a third party application cannot read an SMS content of the SMS during an access prohibition period, thus avoiding leakage of the sensitive information in the SMS during the access prohibition period while implementing authority control for a single SMS granularity.

An access prohibition period using a single SMS as a granularity may be added only in the SMS component, thereby implementing authority control over a single SMS granularity, and achieving the effect that a third party application cannot read an SMS in the SMS component in the access prohibition period. In the meanwhile, the method is simple and convenient to operate and easy to implement.

In the embodiment of FIG. 3A, the SMS component identifies whether the SMS is an SMS carrying sensitive information according to several methods as follows in Step 301.

Alternatively, the SMS component may identify, according to a sender's corresponding identification number of the received SMS, whether the SMS carries sensitive information. Generally, a list may be stored in an SMS background server. For example, the list stores company A and SMS identification number 1 and SMS identification number 2 which are SMS identification numbers corresponding to company A, company B and SMS identification number 3 and SMS identification number 4 which are SMS identification numbers corresponding to company B, company C and SMS identification number 5 and SMS identification number 6 which are SMS identification numbers corresponding to company C, and so on.

Exemplarily, the list stored in the SMS background server is as shown in the following Table 1.

TABLE 1

| Company name | SMS number |
|---|---|
| Company A | SMS number 1 |
|  | SMS number 2 |
| Company B | SMS number 3 |
|  | SMS number 4 |
| Company C | SMS number 5 |
|  | SMS number 6 |

When the sender number of the SMS received by the SMS component is SMS identification number 5, it can be learned from the corresponding relations in Table 1 that a source party of the SMS is company C, and the SMS component identifies the SMS as an SMS carrying sensitive information.

Alternatively, the SMS component may identify, according to an SMS content of the received SMS, whether the SMS carries sensitive information. For example, the SMS content is "[Asan Travel•Go] 06-22 07:15 Kunming Changshui Airport-take-off-08:55 and Chongqing Jiangbei Airport 2B landing Lucky Airlines 8L9863, Order XXXXXXXXXXX, paying, Zhang Wuji (Ticket number: XXX-XXXXXXXXXX). Click on http://tb.cn/3eXIO6y, and check details of the flight on the client.", then the SMS component identifies, according to keywords [Asan Travel•Go] in the SMS content, that the SMS is an SMS carrying sensitive information.

Alternatively, the SMS component may also identify, according to an SMS template, whether the SMS carries sensitive information. For example, the SMS component pre-stores a plurality of SMS templates carrying sensitive information. When the SMS is received, the SMS component matches the received SMS with a stored SMS template. When the received SMS is matched with a certain SMS template, the SMS is identified as an SMS carrying sensitive information.

For example, SMS 1: sender: 140000621 "[Company A] order number XXXXXXXXXXX, paying, the verification number is XXXXXX. Click on http://tb.cn/3eXI06y, and check details on the client."

SMS 2: sender: 140000622 "[Company A] order number XXXXXXXXXX, paying, the verification code is XXXXXX. Click on http://tb.cn/3eXI06y, and check details on the client."

SMS 1 and SMS 2 are SMSs sent by Jingdong Company, a source party identifier of SMS 1 is "140000621", a source party identifier of SMS 2 is "140000622" and the two source parties have the same prefix "1400062". In the meanwhile, the two SMSs contain a keyword "[Company A]".

Exemplarily, two SMS templates constructed by SMS 1 and SMS 2 are as follows.

<payment template 1>□"[Company A]<Order number><Verification code>."

<Payment template 2>☐"[Company A]<Order number><Verification code>."

For example, corresponding relations between extracted templates and combinations of identification characteristics and keywords of the senders of the SMSs are as shown in the following Table 2.

TABLE 2

| SMS characteristic | SMS template |
|---|---|
| 14000062X + [Company A] | <payment template 1> |
| 14000062X + [Company A] | <payment template 2> |

When the SMS received by the SMS component carries a characteristic of "14000062X+[Company A]", the SMS will be matched with <payment template 2> in the SMS templates. Therefore, the SMS component identifies the SMS as an SMS carrying sensitive information.

For example, after a product is purchased in Xiaomi Mall, an order is submitted by clicking, acquisition of a verification code from a mobile phone is selected during payment, and a mobile phone bound with the website of Xiaomi Mall will receive a verification code SMS sent by Xiaomi Company within 60 seconds. Provided that an SMS received at 15:58 is: Sender: 160000621 "[Xiaomi Company] Order number XXXXXXXXXXX paying, the verification code is XXXXXX, please input the verification code within 5 minutes."

Figure 4A:
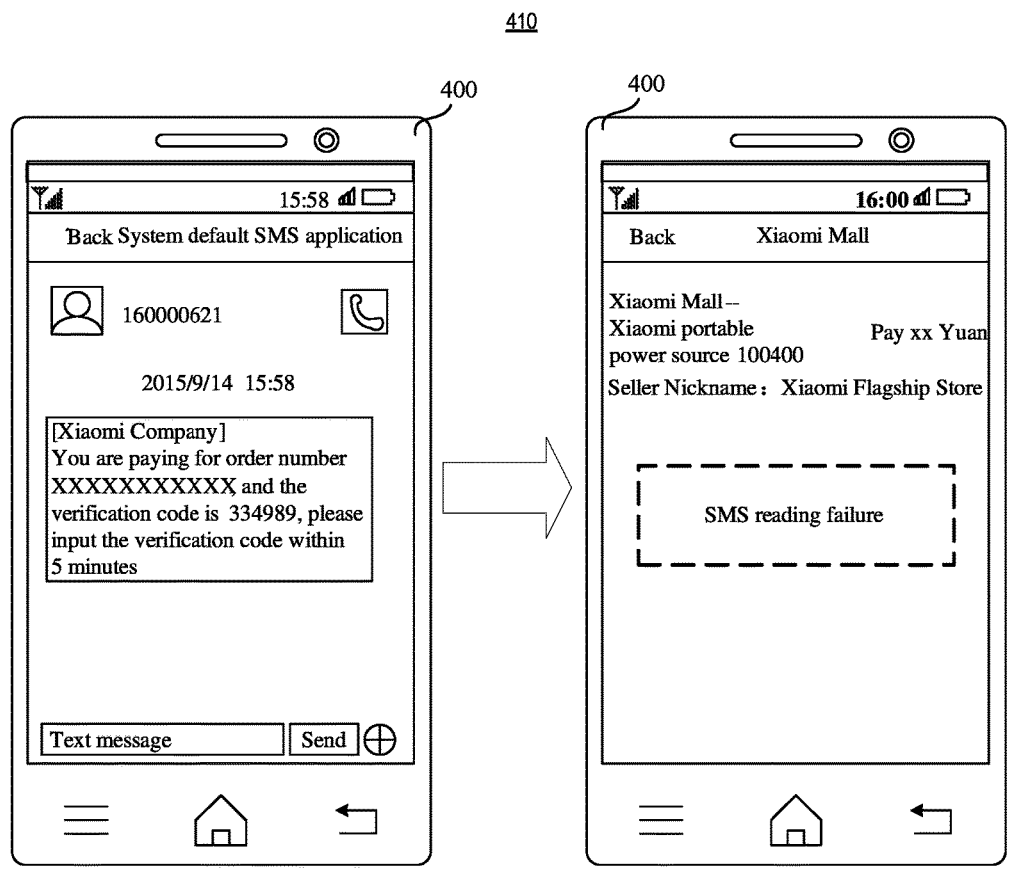
FIG. 4A is a schematic diagram of an interface illustrating an SMS reading method according to an exemplary embodiment.

A third party application "Xiaomi Mall" may send a reading request to the operating system. The operating system may forward the reading request sent by the third party application to the SMS component. The SMS component may determine that a reading time in the reading request is 16:00. A time difference between the reading time and the receiving time of the SMS is 16:00–15:58=2 minutes. Since a duration of 2 minutes is shorter than an active duration that is 5 minutes, the third party application "Xiaomi Mall" fails to read the SMS, as shown in the exemplary first interface transition 410 of exemplary mobile device 400 in FIG. 4A.

Figure 4B:
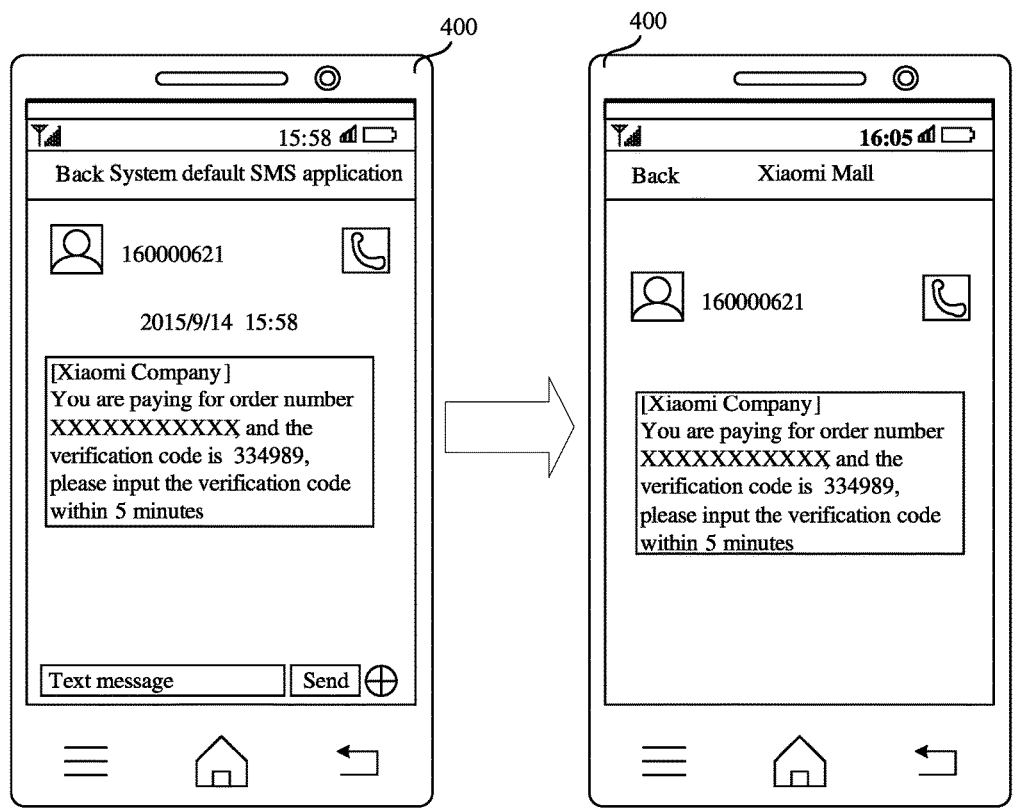
FIG. 4b is a schematic diagram of an interface illustrating an SMS reading method according to another exemplary embodiment.

When the SMS component acquires that a reading time in the reading request is 16:05, a time difference between the reading time and the receiving time of the SMS is 16:05–15:58=7 minutes. Since a duration of 7 minutes is longer than the active duration that is 5 minutes, the third party application "Xiaomi Mall" reads the SMS successfully. In other words, the third party application can read the SMS content of the SMS, as shown in the exemplary second interface transition 420 of exemplary mobile device 400 in FIG. 4B.

Figure 5:
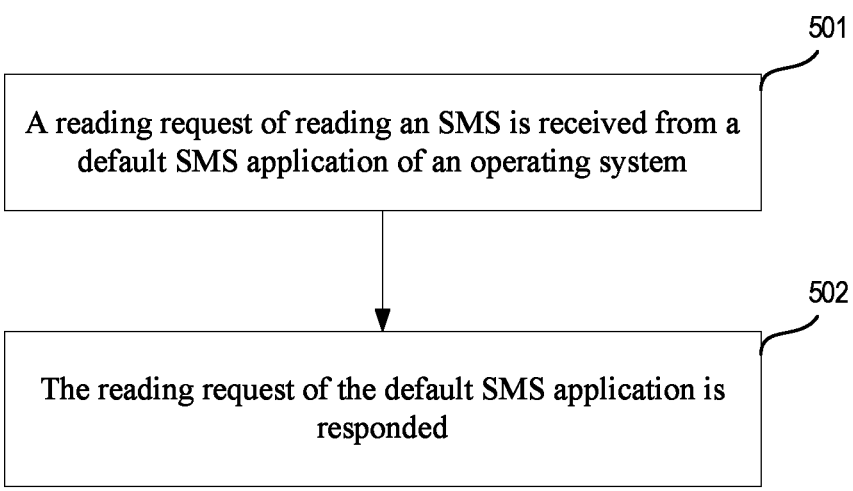
FIG. 5 is a flowchart of an SMS reading method according to still another exemplary embodiment.

In the embodiment of FIG. 3A, all reading requests forwarded by the operating system to the SMS component are reading requests sent by third party applications. In addition or alternatively, a default SMS application of the operating system may also read an SMS content of the SMS component, as shown in flowchart 500 in FIG. 5.

At 501: A reading request for reading the SMS to be read may be received from a default SMS application of the operating system.

For example, the SMS component may receive a reading request from a default SMS application of the operating system, where the reading request includes a request to read an SMS (e.g., the SMS to be read) in the SMS component.

At 502: The reading request of the default SMS application may be responded to.

For example, after receiving the reading request from the default SMS application, the SMS component may respond to the reading request directly.

Figure 6:
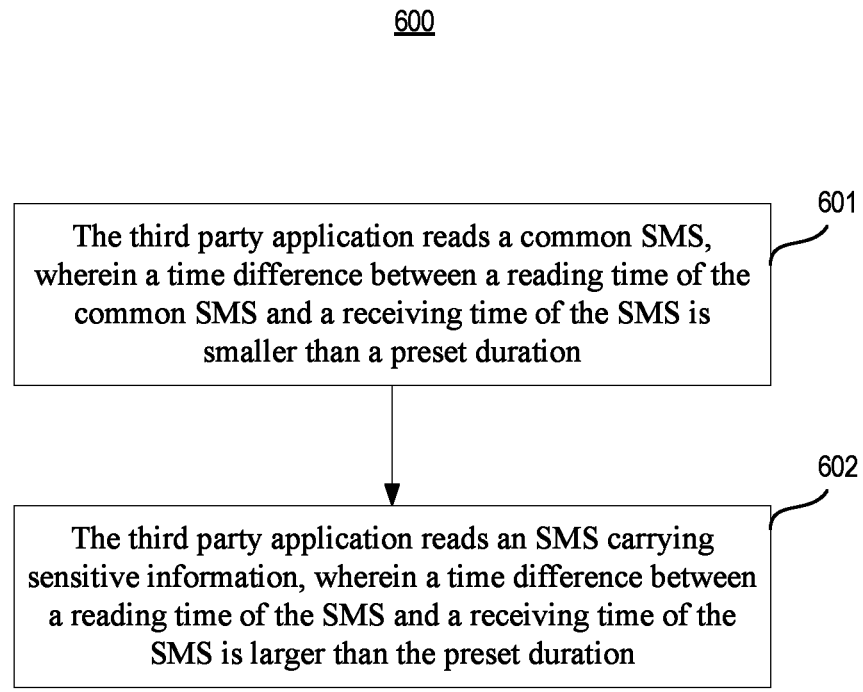
FIG. 6 is a flowchart of an SMS reading method according to still another exemplary embodiment.

Since SMSs in the SMS component may be divided into SMSs including sensitive information and common SMSs that do not include sensitive information, there are two situations in which the third party application may read an SMS in the SMSs, as shown by flowchart 600 in FIG. 6.

At 601: The third party application may read a common SMS, wherein a time difference between a reading time of the common SMS and a receiving time of the SMS to be read is smaller than a preset duration.

The common SMS may refer to an SMS not including sensitive information. The third party application may only need authority to have an SMS reading authority at the operating system level to read the common SMS in the SMS component.

For example, the reading time may refer to the time when an SMS content is read. Since the common SMS may be read in a relatively short period of time and can be displayed immediately after being read, the reading time may be also the time when the SMS is displayed for the first time on a display interface.

Figure 7A:
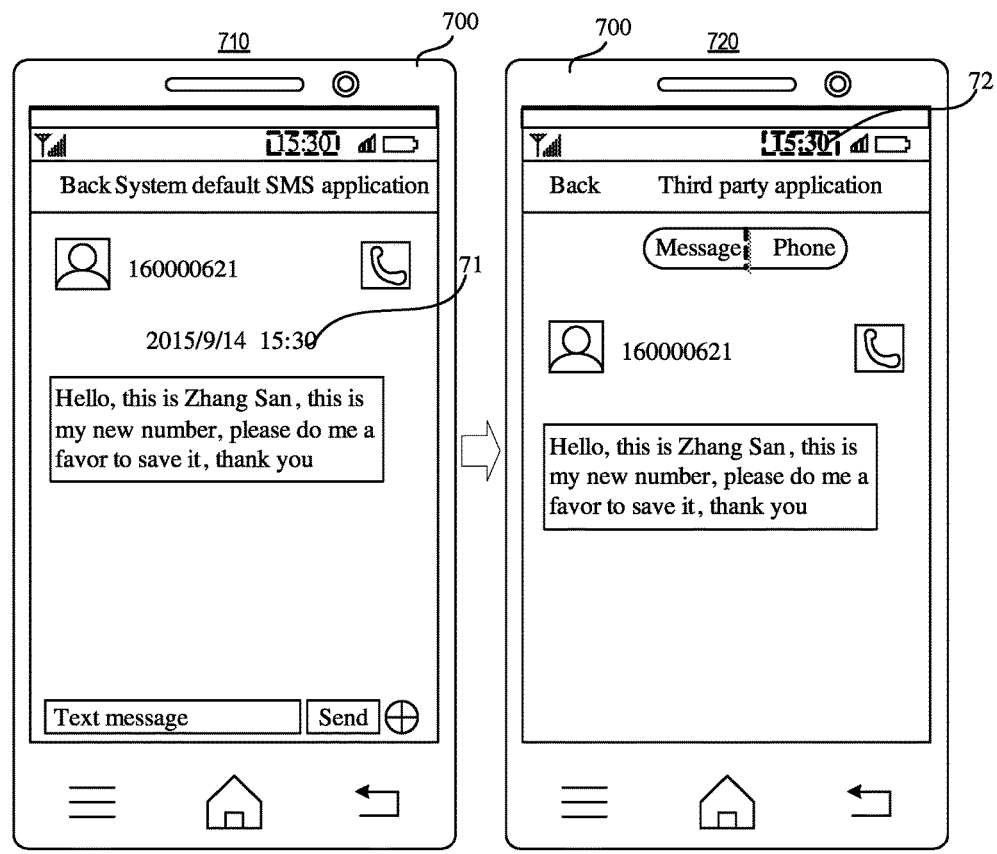
FIG. 7A is a schematic diagram of an interface for reading an SMS according to an exemplary embodiment.

The third party application may send a reading request of reading the common SMS to the operating system. When the third party application has an SMS reading authority, the operation may forward the reading request to the SMS component. The SMS component may directly feed back the common SMS to the third party application. Since little time is consumed, the time difference between the reading time of the common SMS and the receiving time of the common SMS may be smaller than the preset duration. Generally, the time difference is within 1 second. As shown in the exemplary interface 710 of exemplary mobile device 700 in FIG. 7A, 71 is the receiving time of the common SMS, and as shown in the exemplary interface 720 of exemplary mobile device 700 in 72 is the reading time of the common SMS. It may be determined from the time displayed by 72 and 71 that the time difference between the reading time and the receiving time of the SMS is generally calculated by seconds.

The preset duration may be equal to or larger than an active duration of the SMS.

At 602: The third party application may read an SMS including sensitive information, wherein a time difference between a reading time of the SMS and a receiving time of the SMS is larger than the preset duration.

Figure 7B:
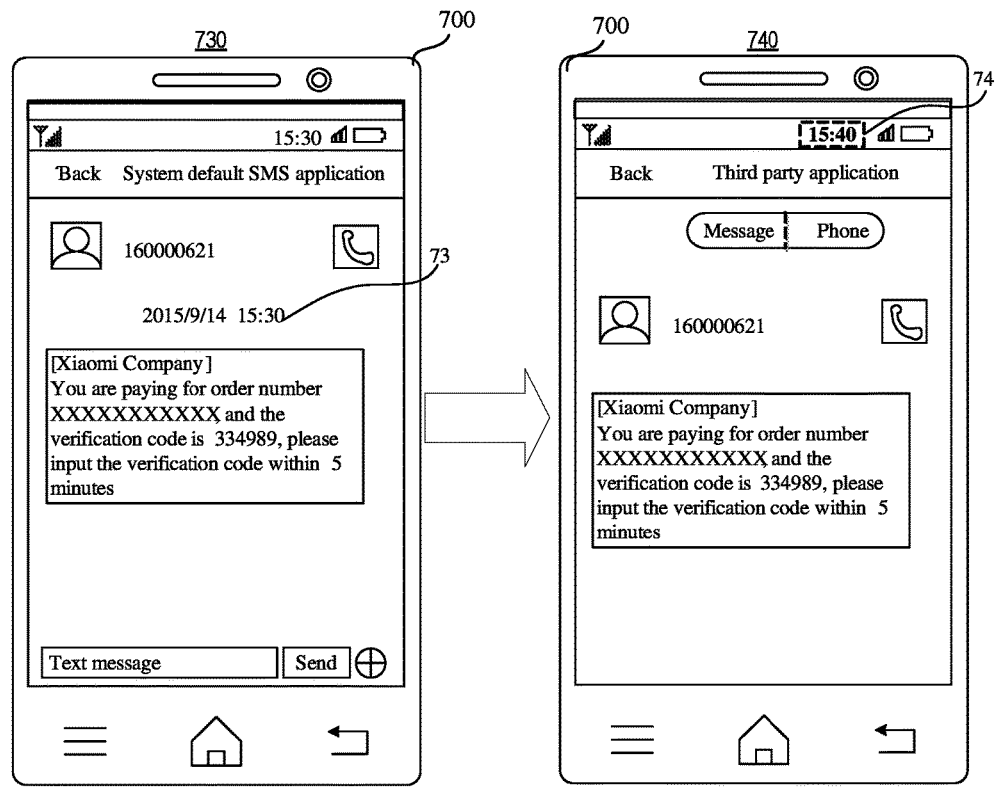
FIG. 7B is a schematic diagram of an interface for reading an SMS according to another exemplary embodiment.

The embodiment described by flowchart 300 of FIG. 3A shows a process in which the third party application reads an SMS including sensitive information. The third party application may acquire the SMS carrying the sensitive information in the SMS component only when a time difference between a reading time of the SMS and a receiving time of the SMS is larger than a preset duration. As shown in the exemplary interface 730 of exemplary mobile device 700 in FIG. 7B, 73 is the receiving time of the SMS carrying the sensitive information, and as shown in the exemplary interface 740 of exemplary mobile device 700 in FIG. 7B, 74 is the reading time of the SMS carrying the sensitive information. It may be determined from the time displayed by 74 and 73 that the time difference between the reading time and the receiving time of the SMS carrying the sensitive information is 15:40–15:30=10 minutes. The time difference is larger than the preset duration and the preset duration is an active duration which is 5 minutes of a verification code in an SMS content.

In the embodiment according to flowchart 600 of FIG. 6, the third party application may read an SMS from the SMS component in two situations while the default SMS application of the operating system reads an SMS in the SMS component in only one situation, as described below.

At 603: The default SMS application of the operating system may read an SMS, wherein a time difference between a reading time of the SMS and a receiving time of the SMS is smaller than a preset duration.

The default SMS application of the operating system may read an SMS in the SMS component directly, thus a time difference between a reading time of the SMS and a receiving time of the SMS is smaller than a preset duration.

The following description refers to device embodiments of the present disclosure, which may be used for executing the method embodiments of the present disclosure. Please refer to the method embodiments of the present disclosure for details not disclosed in the device embodiments of the present disclosure.

Figure 8:
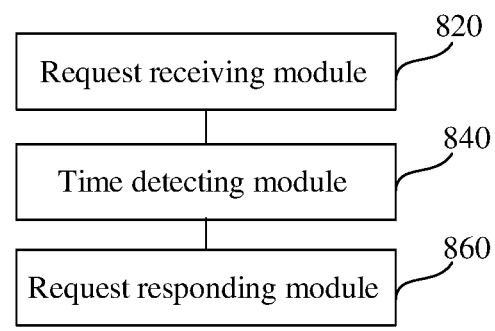
FIG. 8 is a block diagram of an SMS reading device according to an exemplary embodiment.

FIG. 8 is a block diagram of an SMS reading device 800 according to an exemplary embodiment. The SMS reading device 800 may be implemented as a mobile device or a part of the mobile device by combination of software and hardware. Each module described herein may be a combination of software, hardware, firmware, and middleware configured to implement features described as being implemented by the module.

The SMS reading device 800 may include, for example a request receiving module 820, configured to receive from a third party application a reading request of reading an SMS. The SMS reading device 800 may also include a time detecting module 840 configured to determine, when the SMS is an SMS carrying sensitive information, whether a reading time in the reading request is in an access prohibition period of the SMS. The SMS reading device 800 may also include a request responding module 860 configured to send, when the reading time is in the access prohibition period, no response to the reading request.

In the SMS reading device 800 provided in the embodiment of the present disclosure, a reading request for reading an SMS may be received from a third party application. When the SMS is an SMS including sensitive information, determining whether a reading time in the reading request is in an access prohibition period of the SMS may be implemented. When the reading time is determined to be within the access prohibition period, the reading request may not be responded to, so that the problem that a malicious application being able to read a verification code in an SMS to acquire an authority of executing a sensitive operation due a third party application only having an SMS reading authority at the operating system level being authorized to read all SMSs in an SMS component is solved. For an SMS including sensitive information, a third party application is prevented from reading an SMS content of the SMS during an access prohibition period, thus avoiding leakage of the sensitive information in the SMS during the access prohibition period while implementing authority control over a single SMS granularity.

Figure 9:
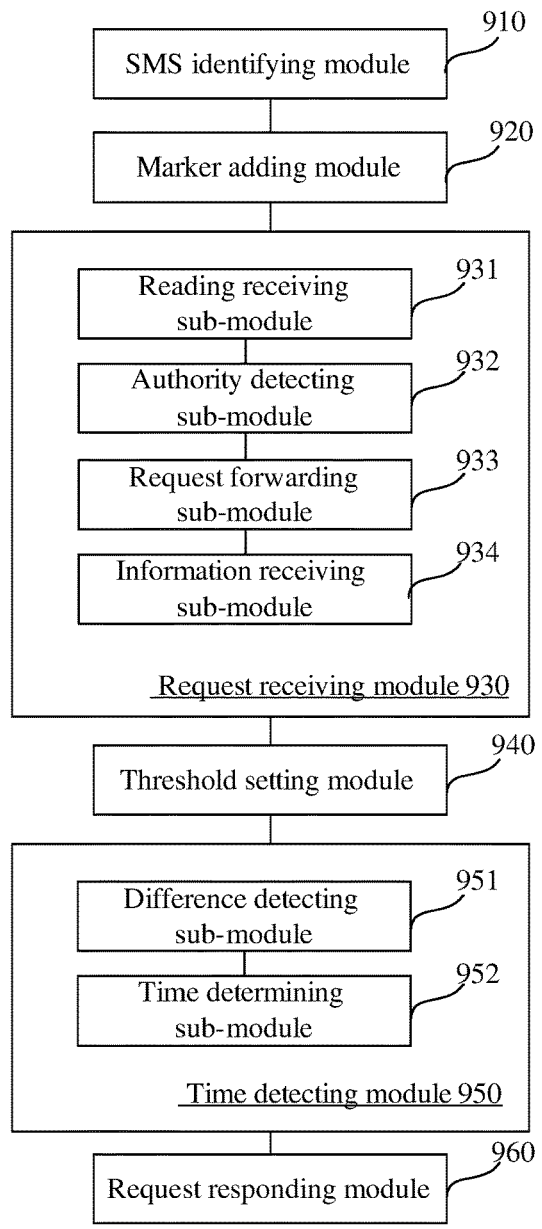
FIG. 9 is a block diagram of an SMS reading device according to another exemplary embodiment.

FIG. 9 shows a block diagram of an SMS reading device 900 according to another exemplary embodiment. The SMS reading device 900 may be implemented as an entire mobile device or a part of the mobile device by combination of software or hardware. The SMS reading device may include an SMS identifying module 910, configured to identify whether a received SMS is an SMS including sensitive information. Alternatively, the SMS identifying module 910 may further be configured to identify, according to characteristic information of the SMS, whether the SMS is an SMS including sensitive information, wherein the characteristic information comprises at least one of a sender number, an SMS content, and/or an SMS template.

The SMS reading device 900 may further include a marker adding module 920 configured to add, when the SMS is an SMS including sensitive information, a preset marker to the SMS, wherein the preset marker may be used for indicating that the SMS is an SMS carrying sensitive information.

The SMS reading device 900 may further include a request receiving module 930, configured to receive from a third party application a reading request of reading an SMS. The request receiving module 930 may include a reading receiving sub-module 931, configured to receive, from the third party application, the reading request of reading the SMS through an operating system. The request receiving module 930 may further include an authority detecting sub-module 932 configured to detect, through the operating system, whether the third party application has an SMS reading authority. The request receiving module 930 may further include a request forwarding sub-module 933 configured to forward, when the third party application has the SMS reading authority, the reading request to an SMS component through the operating system. The request receiving module 930 may further include an information receiving sub-module 934 configured to receive, through the SMS component, the reading request forwarded by the operating system.

The SMS reading device 900 may further include a threshold setting module 940, configured to set a preset threshold according to a default active duration. The threshold setting module 940 may be further configured to extract an active duration of the SMS from an SMS content of the SMS, and set the preset threshold according to the active duration.

The SMS reading device 900 may further include a time detecting module 950 configured to determine, when the SMS is an SMS carrying sensitive information, whether a reading time in the reading request is in an access prohibition period of the SMS. The time detecting module 950 may include a difference detecting sub-module 951, configured to detect whether a time difference between the reading time in the reading request and a receiving time of the SMS is smaller than the preset threshold. The detecting module 950 may further include a time determining sub-module 952 configured to, when the time difference is smaller than the preset threshold, determine that the reading time is in the access prohibition period.

The SMS reading device 900 may further include a request responding module 960 configured to make, when the reading time is in the access prohibition period, no response to the reading request.

In the SMS reading device 900 provided in the embodiment of the present disclosure, a reading request of reading an SMS is received from a third party application. When the SMS is an SMS including sensitive information, whether a reading time in the reading request is in an access prohibition period of the SMS is determined, and when the reading time is in the access prohibition period, the reading request is not responded to, so that the problem where a malicious application may be able to read a verification code in an SMS to acquire an authority of executing a sensitive operation due to a third party application only having an SMS reading authority at the operating system level being able to read all SMSs in an SMS component is solved. For an SMS including sensitive information, a third party application is prevented from reading an SMS content of the SMS during an access prohibition period, thus avoiding leakage of the sensitive information in the SMS during the access prohibition period while implementing authority control for a single SMS granularity.

An access prohibition period using a single SMS as a granularity may be added only to the SMS component, thereby implementing authority control over a single SMS granularity, and achieving the effect that a third party application cannot read an SMS in the SMS component in the access prohibition period. In the meanwhile, the method is simple and convenient to operate and easy to implement.

Figure 10:
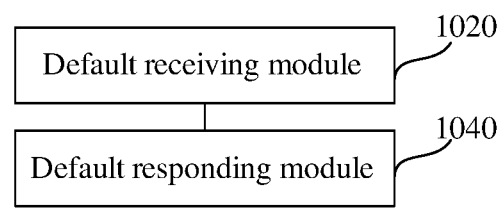
FIG. 10 is a block diagram of an SMS reading device according to still another exemplary embodiment.

In the embodiment of FIG. 9, all reading requests forwarded by the operating system to the SMS component may be reading requests sent by third party applications. A default SMS application of the operating system may also read an SMS content of the SMS component, as shown by exemplary SMS component 1000 in FIG. 10.

The SMS component 1000 may include a default receiving module 1020, configured to receive, from a default SMS application of the operating system, a reading request of reading the SMS. The SMS component 1000 may also include a default responding module 1040, configured to respond to the reading request of the default SMS application.

Figure 11:
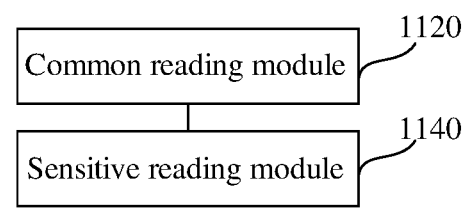
FIG. 11 is a block diagram of an SMS reading device according to still another exemplary embodiment.

Since SMSs in the SMS component may be divided into SMSs including sensitive information and common SMSs, there may be two situations in which the third party application also reads an SMS in the SMSs, as shown in FIG. 11:

A common reading module 1120 of the third party application, may be configured to read a common SMS for the third party application, wherein a time difference between a reading time of the common SMS and a receiving time of the common SMS is smaller than a preset duration. A sensitive reading module 1140 of the third party application, may be configured to read an SMS including sensitive information for the third party application, wherein a time difference between a reading time of the SMS and a receiving time of the SMS is larger than the preset duration. The preset duration may be equal to or smaller than an active duration of an SMS.

The default SMS application of the operating system may read a common SMS and an SMS including sensitive information in only one situation by, for example, the following module:

A default reading module, configured to read an SMS for the default SMS application of the operating system, wherein a time difference between a reading time of the SMS and a receiving time of the SMS is smaller than a preset duration (not shown in the figure).

Specific methods for modules in the devices in the embodiments above to execute operations have been expounded in the embodiments related to the method, and will not be elaborated and described in details herein.

An embodiment of the present disclosure further provides an SMS reading device. The SMS reading device may be configured to implement an SMS reading method provided by an embodiment of the present disclosure. The SMS reading device may include: a processor; and a memory configured to store instructions executable by the processor, wherein the processor may be configured to: receive from a third party application a reading request of reading an SMS, when the SMS is an SMS carrying sensitive information, detect whether a reading time in the reading request is in an access prohibition period of the SMS, and when the reading time is in the access prohibition period, not respond to the reading request.

An embodiment of the present disclosure further provides an SMS reading device. The SMS reading device may be configured to implement an SMS reading method provided by an embodiment of the present disclosure. The SMS reading device may include: a processor, and a memory configured to store instructions executable by the processor.

The processor may be configured to: read a common SMS for a third party application, wherein a time difference between a reading time of the common SMS and a receiving time of the common SMS is smaller than a preset duration, read an SMS including sensitive information for the third party application, wherein a time difference between a reading time of the SMS and a receiving time of the SMS is larger than the preset duration.

Figure 12:
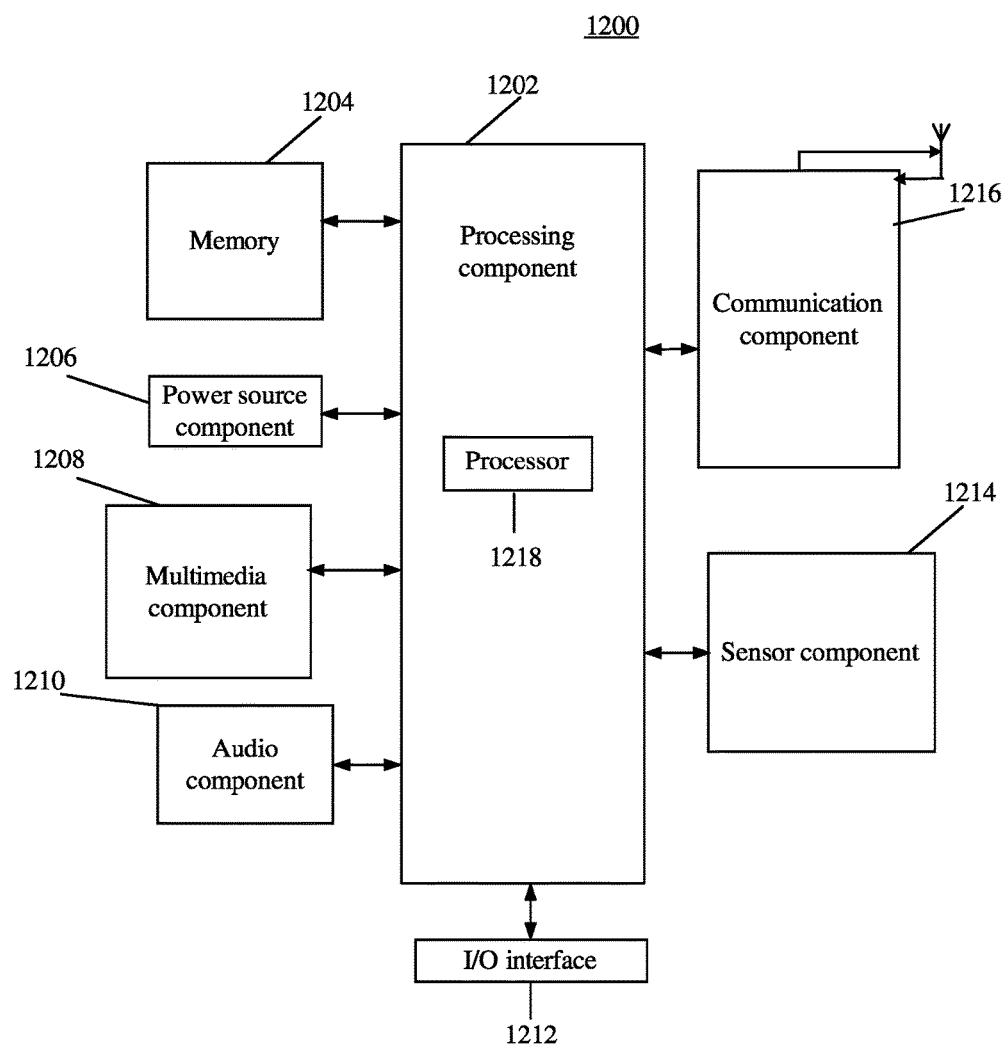
FIG. 12 is a block diagram of an SMS reading device according to an exemplary embodiment.

FIG. 12 shows a block diagram of a device 1200 according to an exemplary embodiment. For example, the device 1200 may be a mobile phone, a computer, a digital broadcasting device, a message transceiver, a game console, a tablet device, a medical device, a fitness device, a personal digital assistant, or other device configured to implement one or more of the features described herein.

Referring to FIG. 12, the device 1200 may include one or more of the following components: a processing component 1202, a memory 1204, a power source component 1206, a multimedia component 1208, an audio component 1210, an Input/Output (I/O) interface 1212, a sensor component 1214 and a communication component 1216.

Generally, the processing component 1202 controls overall operations of the device 1200, such as operations associated with display, a telephone call, data communication, a camera operation and a recording operation. The processing component 1202 may include one or more processors 1218 to execute instructions so as to perform all or part of the steps of the methods described herein. Besides, the processing component 1202 may include one or more modules, so as to process interaction between the processing component 1202 and other components. For example, the processing component 1202 may include a multimedia module so as to facilitate interaction between the multimedia component 1208 and the processing component 1202.

The memory 1204 is configured to store various types of data so as to support operations in the device 1200. Examples of such data include an instruction of any application or method operated on the device 1200, contact data, data of a telephone directory, a message, a picture, a video and so on. The memory 1204 may be implemented using any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power source component 1206 provides power for various components of the device 1200. The power source component 1206 may include a power source management system, one or more power sources, and other components associated with power generation, management and distribution of the device 1200.

The multimedia component 1208 includes a screen providing an output interface between the device 1200 and a user. In some embodiments, the screen may include a Liquid Crystal Display (LCD) and a Touch Panel (TP). When the screen includes the TP, the screen may be implemented as a touch screen to receive an input signal from the user. The TP includes one or more touch sensors so as to sense a touch, a slide, and a gesture on the TP. The touch sensor may not only sense a touch or a boundary of a slide, but also detect a duration and a pressure related to the touch or the slide. In some embodiments, the multimedia component 1208 includes a front camera and/or a rear camera. When the device 1200 is in an operation mode, such as a camera mode or a video mode, the front camera and/or the rear camera may receive external multimedia data. Each front camera and each rear camera may be a fixed optical lens system or have focus and optical zoom capability.

The audio component 1210 is configured to output and/or input an audio signal. For example, the audio component 1210 includes a Microphone (MIC). When the device 1200 is in an operation mode, such as a calling mode, a recording mode and a voice recognition mode, the MIC is configured to receive an external audio signal. The received audio signal may be further stored in the memory 1204 or sent by the communication component 1216. In some embodiments, the audio component 1210 further includes a loudspeaker, configured to output the audio signal.

The I/O interface 1212 provides an interface between the processing component 1202 and peripheral interface modules. The peripheral interface modules may be a keyboard, a click wheel, buttons and so on. These buttons may include, but are not limited to a homepage button, a volume button, a start button and a lock button.

The sensor component 1214 includes one or more sensors configured to provide status assessments of various aspects of the device 1200. For example, the sensor component 1214 may detect an open/closed state of the device 1200, and the relative locations of the components. For example, the components are the display and the keypad of the device 1200. The sensor component 1214 may further detect a change in position of the device 1200 or a component of the device 1200, the presence of contact between the user and the device 1200, an orientation or an acceleration/deceleration of the device 1200 and a change in the temperature of the device 1200. The sensor component 1214 may include a proximity sensor, configured to detect the presence of a nearby object without any physical contact. The sensor component 1214 may further include an optical sensor, such as a Complementary Metal Oxide Semiconductor (CMOS) or Charge Coupled Device (CCD) image sensor used in an imaging application. In some embodiments, the sensor component 1214 may further include an acceleration sensor, a gyro sensor, a magnetic sensor, a pressure sensor or a temperature sensor.

The communication component 1216 is configured to facilitate wired or wireless communication between the device 1200 and other devices. The device 1200 may be accessed into a wireless network based on a communication standard, such as Wireless Fidelity (WiFi), the second Generation (2G) or the third Generation (3G), or a combination thereof. In an exemplary embodiment, the communication component 1216 receives a broadcast signal from an external broadcast management system or broadcast related information through a broadcast channel. In an exemplary embodiment, the communication component 1216 further includes a Near Field Communication (NFC) module so as to promote short distance communication. For example, the NFC module may be implemented based on a Radio-frequency Identification (RFID) technology, an Infrared Data Association (IrDA) technology, an Ultra Wide Band (UWB) technology, a Bluetooth (BT) technology and other technologies.

In an exemplary embodiment, the device 1200 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, so as to execute the SMS reading method above.

In exemplary embodiments, there is also provided a non-transitory computer-readable storage medium including instructions, such as included in the memory 1204, executable by the processor 1218 of the device 1200, for performing the SMS reading method above. For example, the non-temporary computer readable storage medium may be a ROM, a Random-Access Memory (RAM), a Compact Disc-ROM (CD-ROM), a magnetic tape, a floppy disk, an optical data memory and so on.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims. It should be noted that a reference to an SMS may be understood to be a reference to an SMS message.

INDUSTRY APPLICABILITY

In the embodiments of the present disclosure, a reading request of reading an SMS is received from a third party application; when the SMS is an SMS carrying sensitive information, whether a reading time of the reading request is in an access prohibition period of the SMS is detected, and when the reading time is in the access prohibition period, the reading request is not responded, so that the problem that a malicious application can read a verification code in an SMS to acquire an authority of executing a sensitive operation due to the reason that a third party application only having an SMS reading authority at the operating system level can read the SMS content in an SMS component is solved, and for an SMS carrying sensitive information, a third party application cannot read the SMS content of the SMS during an access prohibition period, thus avoiding leakage of the sensitive information in the SMS during the access prohibition period while implementing authority control over a single SMS granularity.

What is claimed is:

1. A method for determining a read authority of a Short Message Service (SMS), the method comprising:
    receiving, by an operating system of a mobile device, a reading request for reading an SMS stored on an SMS component of the mobile device, wherein the reading request is received from a third party application running on the mobile device;
    determining, by the operating system, whether the third party application is approved to read the SMS based on an SMS reading authority list stored in the operating system at an operating system level, wherein the operating system determines that the third party application is approved to read the SMS when the third party application is included in the SMS reading authority list;

when determining that the third party application is approved to read the SMS, forwarding, by the operating system, the reading request to an SMS component running on the mobile device;

determining, by the SMS component, that the SMS is an SMS carrying sensitive information;

determining whether a reading time in the reading request is within an access prohibition period corresponding to the SMS at an SMS component level, by:

determining whether a time difference between the reading time in the reading request and a receiving time of the SMS is smaller than a preset threshold, wherein the preset threshold is set by the SMS component according to a default active duration, and the default active duration is determined by determining that the SMS contains a verification code or the SMS contains an activation code; and determining that the reading time is within the access prohibition period when the time difference is smaller than the preset threshold; and when the reading time is determined to be within the access prohibition period, withholding, by the SMS component, transmission of a response back to the third party application in response to the reading request.

2. The method of claim 1, wherein the preset threshold is set by:

extracting an active duration of the SMS from an SMS content the SMS, and setting the preset threshold according to the active duration.

3. The method of claim 1, before receiving, by the operating system of the mobile device, the reading request for reading the SMS stored on the SMS component of the mobile device, further comprising:

receiving, by the SMS component, the SMS, and determining whether the SMS includes sensitive information; and when the SMS is determined to include sensitive information, adding, by the SMS component, a preset marker to the SMS, wherein the preset marker is configured to indicate that the SMS is an SMS including sensitive information.

4. The method of claim 3, wherein determining whether the SMS includes sensitive information comprises:

determining the SMS includes sensitive information based on characteristic information corresponding to the SMS, wherein the characteristic information comprises at least one of a sender number, an SMS content, or an SMS template.

5. The method of claim 1, further comprising:

receiving, from a default SMS application of an operating system, a reading request for reading the SMS; and responding to the reading request from the default SMS application.

6. A non-transitory computer-readable storage medium having stored therein instructions that, when executed by a processor of a mobile device, causes the mobile device to perform a method for reading a Short Message Service (SMS), the method comprising:

receiving, by an operating system of a mobile device, a reading request for reading an SMS stored on an SMS component of the mobile device, wherein the reading request is received from a third party application running on the mobile device;

determining, by the operating system, whether the third party application is approved to read the SMS based on an SMS reading authority list stored in the operating system at an operating system level, wherein the operating system determines that the third party application is approved to read the SMS when the third party application is included in the SMS reading authority list;

when determining that the third party application is approved to read the SMS, forwarding, by the operating system, the reading request to an SMS component running on the mobile device;

determining, by the SMS component, that the SMS is an SMS carrying sensitive information;

determining whether a reading time in the reading request is within an access prohibition period corresponding to the SMS at an SMS component level, by:

determining whether a time difference between the reading time in the reading request and a receiving time of the SMS is smaller than a preset threshold, wherein the preset threshold is set by the SMS component according to a default active duration, and the default active duration is determined by determining that the SMS contains a verification code or the SMS contains an activation code; and determining that the reading time is within the access prohibition period when the time difference is smaller than the preset threshold; and when the reading time is determined to be within the access prohibition period, withholding, by the SMS component, transmission of a response back to the third party application in response to the reading request.

7. The non-transitory computer-readable storage medium of claim 6, wherein the preset threshold is set by:

extracting an active duration of the SMS from an SMS content included in the SMS, and setting the preset threshold according to the active duration.

8. The non-transitory computer-readable storage medium of claim 6, before receiving, by the operating system of the mobile device, the reading request for reading the SMS stored on the SMS component of the mobile device, the method further comprising:

receiving, by the SMS component, the SMS, and determining whether the SMS includes sensitive information; and when the SMS is determined to include sensitive information, adding, by the SMS component, a preset marker to the SMS, wherein the preset marker is configured to indicate that the SMS is an SMS including sensitive information.

9. The non-transitory computer-readable storage medium of claim 8, wherein determining whether the SMS includes sensitive information comprises:

determining the SMS includes sensitive information based on characteristic information corresponding to the SMS, wherein the characteristic information comprises at least one of a sender number, an SMS content, or an SMS template.

10. The non-transitory computer-readable storage medium of claim 6, the method further comprising:

receiving, from a default SMS application of an operating system, a reading request for reading the SMS; and responding to the reading request from the default SMS application.

11. A device for reading a Short Message Service (SMS), comprising:

a processor; and a memory, configured to store instructions executable by the processor;

wherein the processor is configured to execute the instructions to:

receive, by an operating system of a mobile device, a reading request for reading an SMS stored on an SMS component of the mobile device, wherein the reading request is received from a third party application running on the mobile device;

determine, by the operating system, whether the third party application is approved to read the SMS based on an SMS reading authority list stored in the operating system at an operating system level, wherein the operating system determines that the third party application is approved to read the SMS when the third party application is included in the SMS reading authority list;

when determining that the third party application is approved to read the SMS, forward, by the operating system, the reading request to an SMS component running on the mobile device;

determine, by the SMS component, that the SMS is an SMS carrying sensitive information;

determine whether a reading time in the reading request is within an access prohibition period corresponding to the SMS at an SMS component level, by:

determining whether a time difference between the reading time in the reading request and a receiving time of the SMS is smaller than a preset threshold, wherein the preset threshold is set by the SMS component according to a default active duration, and the default active duration is determined by determining that the SMS contains a verification code or the SMS contains an activation code;

determining that the reading time is within the access prohibition period when the time difference is smaller than the preset threshold; and when the reading time is determined to be within the access prohibition period, withhold, by the SMS component, transmission of a response back to the third party application in response to the reading request.

12. The device of claim 11, wherein the processor is configured to execute the instructions to:

set the preset threshold by extracting an active duration of the SMS from an SMS content included in the SMS, and setting the preset threshold according to the active duration.

13. The device of claim 11, wherein the processor is configured to execute the instructions to: before receiving, by the operating system of the mobile device, the reading request for reading the SMS stored on the SMS component of the mobile device:

receive, by the SMS component, the SMS, and determining whether the SMS includes sensitive information; and when the SMS is determined to include sensitive information, add, by the SMS component, a preset marker to the SMS, wherein the preset marker is configured to indicate that the SMS is an SMS including sensitive information.

14. The device of claim 13, wherein the processor is configured to execute the instructions to:

determine whether the SMS is an SMS including sensitive information based on characteristic information corresponding to the SMS.

15. The device of claim 14, wherein the characteristic information includes at least one of a sender number, an SMS content, or an SMS template.

* * * * *